(12) United States Patent
Brouwer et al.

(10) Patent No.: US 11,084,425 B2
(45) Date of Patent: Aug. 10, 2021

(54) ACTUATOR MECHANISM, EXTERIOR MIRROR DEVICE AND VEHICLE

(71) Applicant: MCi (Mirror Controls International) Netherlands B.V., Woerden (NL)

(72) Inventors: Stefan Fritz Brouwer, Schoonhoven (NL); Paulus Gerardus Maria van Stiphout, Woerden (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 102 days.

(21) Appl. No.: 15/512,937

(22) PCT Filed: Sep. 21, 2015

(86) PCT No.: PCT/NL2015/050651
§ 371 (c)(1),
(2) Date: Mar. 21, 2017

(87) PCT Pub. No.: WO2016/048139
PCT Pub. Date: Mar. 31, 2016

(65) Prior Publication Data
US 2017/0240114 A1 Aug. 24, 2017

(30) Foreign Application Priority Data

Sep. 22, 2014 (NL) .................................... 2013510

(51) Int. Cl.
*B60R 1/072* (2006.01)
*F16D 7/00* (2006.01)
(Continued)

(52) U.S. Cl.
CPC ................ *B60R 1/072* (2013.01); *F16D 7/00* (2013.01); *F16H 19/001* (2013.01); *F16H 19/02* (2013.01);
(Continued)

(58) Field of Classification Search
CPC ....... B60R 1/072; F16H 19/001; F16H 19/02; F16H 1/16; F16H 57/039; F16H 2057/02082; F16H 1/203; F16D 7/00
(Continued)

(56) References Cited

U.S. PATENT DOCUMENTS 3,005,385 A 10/1961 Meade et al.
8,915,601 B2 * 12/2014 Foote ...................... B60R 1/072
359/876

(Continued)

FOREIGN PATENT DOCUMENTS

EP 0460666 A1 12/1991

*Primary Examiner* — William R Alexander
*Assistant Examiner* — Rahman Abdur
(74) *Attorney, Agent, or Firm* — Volpe Koenig

(57) ABSTRACT

The invention relates to an actuator mechanism for adjusting at least one angular position of a mirror element in an exterior mirror device for a motor vehicle. The actuator mechanism comprises a base element and a mirror element movably coupled with the base element, which comprises a mirror support for supporting a mirror surface. The mirror element is rotatable relative to the base element about at least a first pivoting axis with the aid of a first electric motor provided in the actuator mechanism, which extends in a longitudinal direction that is substantially transverse to a supporting surface of the mirror support. What can be elegantly facilitated by this, for instance also in the case of a relatively small mirror surface that is only a few centimeters wide and/or is only a few centimeters long, is that, as seen from a direction in which during use the mirror surface is being viewed by a driver, such electric motor does not protrude, or hardly protrudes, next to, above and/or below the mirror surface.

22 Claims, 7 Drawing Sheets

(51) Int. Cl.
  *F16H 19/00* (2006.01)
  *F16H 19/02* (2006.01)
  *F16H 1/16* (2006.01)
  *F16H 1/20* (2006.01)
  *F16H 57/039* (2012.01)
  *F16H 57/02* (2012.01)

(52) U.S. Cl.
  CPC .............. *F16H 1/16* (2013.01); *F16H 1/203* (2013.01); *F16H 57/039* (2013.01); *F16H 2057/02082* (2013.01)

(58) Field of Classification Search
  USPC .......................................................... 359/876
  See application file for complete search history.

(56) References Cited

U.S. PATENT DOCUMENTS

| | | | | |
|---|---|---|---|---|
| 2005/0174645 | A1* | 8/2005 | Boddy | B60Q 1/2665 359/599 |
| 2010/0321757 | A1* | 12/2010 | Cammenga | B60R 1/072 359/267 |
| 2012/0218657 | A1* | 8/2012 | Chino | B60R 1/072 359/876 |

* cited by examiner

ACTUATOR MECHANISM, EXTERIOR MIRROR DEVICE AND VEHICLE

The invention relates to external mirror devices and to actuator mechanisms, in particular actuator mechanisms for adjusting the angular position of a mirror element provided in an exterior mirror device for a motor vehicle, which mirror element comprises a mirror support and a mirror surface supported thereby, for instance formed by a plate of mirror glass.

It is generally known that motor vehicles, such as trucks, buses, campers and cars, are provided with aids to enable observation of what is happening next to and/or behind the vehicle. Typically, such aids are implemented as external mirror devices. An external mirror device normally comprises a housing which is arranged on a more forwardly located part of the side of the motor vehicle and which is provided with a mirror element. The part of the mirror element that forms the mirror surface, for example, a mirror glass, is often substantially plate-shaped and includes a first angle, located in the horizontal plane, with the longitudinal direction of the motor vehicle and includes a second angle, located in a vertical plane transverse to the mirror element, with the horizontal plane. The desired magnitude of the first and second angle, respectively, depends inter alia on positioning of the driver's seat and/or the steering wheel, and/or of the height and/or the personal preferences of the driver of the motor vehicle. To be able to adjust the desired angles for the driver, the mirror element is usually connected with the housing in a manner rotatable about at least one pivoting axis, but often about two pivoting axes mutually including a perpendicular angle.

As the angles desired by a driver can normally be assessed only from the position of the driver of the vehicle, and because the driver usually cannot adjust the mirror element by hand from this position, it is desirable to be able to set the position of the mirror element of the exterior mirror device remotely with the aid of an actuator mechanism.

Such actuator mechanisms are generally known and are applied, for instance, to enable a mirror element to be rotated about two mutually perpendicular pivoting axes. To this end, the actuator mechanism usually comprises two electric motors situated behind the mirror surface, which are placed at an angle of 90° to each other and can each, via a respective drive train, have the mirror element rotate about one of the two mutually perpendicular pivoting axes.

While such actuator mechanisms are eminently suitable for many situations where it is desired to apply exterior mirror devices, there are also situations where such known actuator mechanisms are not satisfactory.

This holds true, for instance, in the case where it is desired to be able to adjust a relatively small mirror element and/or a relatively small mirror surface thereof. For instance, the mirror surface formed by the mirror glass of a so-called blind spot mirror is often only a few centimeters long and/or only a few centimeters wide. In such a case, where the mirror glass is, for instance, only about 2 or 3 centimeters long and/or, for instance, only about 6 centimeters wide, there is usually not sufficient space for the two electric motors conventional for actuator mechanisms for mirror elements to be put transversely to each other behind the mirror glass holder which is flat at the front.

Additionally or alternatively, the available space for an actuator mechanism may be limited in that it may be desirable, for instance, to include other elements behind the mirror glass, such as, for example, a blind spot camera or a display.

The present disclosure contemplates the provision of an alternative exterior mirror device with adjustable mirror element and/or of an alternative actuator mechanism, preferably an exterior mirror device and/or actuator mechanism that counteracts at least one of the disadvantages mentioned. Most preferably, the invention contemplates the provision of an actuator mechanism that is suitable for adjusting a relatively small mirror element and/or relatively small mirror surface, for instance formed by a relatively small mirror glass, whereby there is no electric motor provided that protrudes in the width direction of the mirror glass behind the mirror glass or the mirror support and there is preferably also no electric motor provided that protrudes in the longitudinal direction behind the mirror glass or the mirror support.

In a first aspect the present disclosure provides an actuator mechanism for adjusting at least one angular position of a mirror element in an exterior mirror device for a motor vehicle, comprising a base element and a mirror element movably coupled with the base element, comprising a mirror support for supporting a mirror surface, the mirror element being rotatable relative to the base element about at least a first pivoting axis with the aid of a first electric motor provided in the actuator mechanism, which first electric motor extends in a longitudinal direction which is substantially transverse to a supporting surface of the mirror support on which during use the mirror surface is supported by the mirror support.

In a second aspect, the present disclosure provides an exterior mirror device which is provided with such an actuator mechanism.

Placing the electric motor such that it extends substantially in a longitudinal direction that is substantially transverse to a supporting surface of the mirror support can elegantly facilitate the first electric motor not or hardly protruding next to, above and/or below the mirror surface, as seen from a direction in which during use the mirror surface is being viewed by the driver, also in the case of a relatively small mirror surface that is just a few centimeters wide and/or is just a few centimeters high.

In embodiments, the mirror element may furthermore be rotatable relative to the base element about a second pivoting axis, which is substantially transverse to the first pivoting axis. This is done with the aid of a second electric motor provided in the actuator mechanism, which extends in a longitudinal direction that, just like the longitudinal direction of the first electric motor, is substantially transverse to the supporting surface of the mirror support. It is noted that the first and second electric motor can hence be placed substantially parallel to each other, preferably both behind the supporting surface of the mirror support.

In the context of this disclosure, it can at least be understood, for instance, that the longitudinal direction and/or the output shaft of the electric motor extends 'substantially transversely' to the supporting surface if it extends in a direction away from the supporting surface of the mirror support and/or if the smallest angle between, on the one hand, the supporting surface or a flat surface that directionally approximates a possibly curved supporting surface as well as possible and, on the other hand, the longitudinal direction and/or the output shaft of the electric motor is not less than about 60°, 65°, 70°, 75° or 80°.

Additionally or alternatively, a longitudinal direction of a motor that extends 'substantially transversely' to the supporting surface can at least be understood to mean that the longitudinal direction of the motor and/or the output shaft or so-called driving shaft of the motor at least in a neutral position of the supporting surface is practically perpendicular to the supporting surface. The neutral position of the supporting surface can then be a position from which the supporting surface can be rotated in two senses about the first pivoting axis, and, in case there is also a second pivoting axis substantially perpendicular to the first pivoting axis, from which the supporting surface can also be rotated in two senses about the second pivot axis. For instance, the supporting surface can be rotated from the neutral position to one side about the first pivoting axis through an angle of at most about 15°, 12°, 10° or 8° and to the other side, for instance, through an angle of at most about 15°, 12°, 10° or 8°. If there is a second pivoting axis, the supporting surface can be rotated from the neutral position to one side about the second pivoting axis, for instance, through an angle of at most about 15°, 12°, 10° or 8° and to the other side, for instance, through an angle of at most about 15°, 12°, 10° or 8° about the second pivoting axis.

Placing also the second electric motor such that it extends substantially transversely to the supporting surface of the mirror support can, for instance in the above-mentioned case of a relatively small mirror surface for a blind spot mirror, elegantly facilitate the second electric motor not or hardly protruding next to, above and/or below the mirror surface, either.

In addition, placing the longitudinal direction of the first and/or the second electric motor in a direction away from the supporting surface of the mirror support can facilitate the base element of the actuator mechanism, which base element can for instance be a casing or a frame for housing and/or holding the first and/or second electric motor, not or hardly protruding beyond the mirror surface, either. This can be highly advantageous, for instance when it is highly desirable for the actuator mechanism, and/or an exterior mirror device in which the actuator mechanism is provided, to be made of relatively low and/or narrow design. This can be the case, for instance, with a blind spot mirror device, in particular when this is placed between, next to, under and/or above one or more other exterior mirror devices, due to which there may be only limited space available in the width and/or length direction, while in height direction, that is, the direction that extends away at the back of the mirror surface, there can, surprisingly, be sufficient space available.

Further, it is noted that thanks to the placement of the electric motor(s) in a direction substantially transverse to the supporting surface, it can be relatively simple to provide a relatively narrow and/or relatively low exterior mirror device, which can then be relatively deep or "long" in that sense, but not too long and/or too wide. This proves to be particularly advantageous in many cases. Thus, for instance in the case of an exterior mirror device mounted on the side of the vehicle opposite to the driver's side, this additional height, seen from the driver, may fall behind a part of the coachwork, for instance behind a bar between the front windscreen and the side window remote from the driver. Due to the limited width and/or length of the exterior mirror device, a blind spot caused by the exterior mirror device, i.e., an area located, seen from the driver, behind this device and which is hidden from his sight by the exterior mirror device, can be kept relatively small, in contrast to what may be the case with an exterior mirror device having a conventional actuator mechanism where the electric motors extend substantially in a direction that is in a plane parallel to the mirror surface.

The first electric motor and/or the second electric motor can be, most preferably, an electric motor with mechanical or sensory position feedback of the rotor position for the control of coils of the electric motor.

Preferably, the first and/or the second electric motor may be implemented as an electric motor with brushes, such as, for instance, a DC motor with brushes.

It is noted that while in advantageous embodiments a mirror surface, which preferably comprises mirror glass or is made thereof, is supported by the mirror support, the mirror support can alternatively, or additionally, support other elements, preferably elements that can facilitate viewing what is going on beside or behind a vehicle. Thus, the mirror support may for instance be provided with a viewing screen or so-called display, which to that end can show images, for instance provided by a camera, practically without appreciable delay, preferably in mirrored-image fashion. Alternatively or additionally, the mirror support can support a different element, for instance a (video) camera.

In a third aspect of the disclosure, an actuator mechanism is provided, where on an output shaft of a first electric motor of the actuator mechanism, a first gearwheel, such as, for instance, an involute gearwheel or a worm wheel, is mounted at least substantially non-rotatably and preferably also substantially slidably in axial direction. The first gearwheel may for instance be mounted substantially non-rotatably with the aid of, for instance, a slip coupling, but may alternatively also be fixed on the output shaft in at least the rotational direction of the output shaft. For instance in the case where the first gearwheel is not mounted on the output shaft with the aid of a slip coupling, it may be advantageous that at least at one other place in the drive train a slip coupling may be included. Furthermore, in the actuator mechanism according to this third aspect of the disclosure, a second gearwheel, such as for instance an involute gearwheel, a hypoid gearwheel or a worm wheel, is provided, which is placed on the output shaft of the first electric motor rotationally, and preferably bearing-mounted. Preferably, the second gearwheel is substantially fixed relative to the output shaft in axial direction.

What can be elegantly facilitated when in an actuator mechanism at least a second gearwheel, and possibly even one or more further gearwheels, is placed rotationally on an output shaft of an electric motor of the actuator mechanism, is that the actuator mechanism and/or a drive train thereof can be made of relatively compact and/or relatively robust or stable design.

It will be clear to those skilled in the art that such actuator mechanism according to this third aspect of the disclosure can also be advantageously applied in cases where the electric motor(s) provided do not extend substantially in a direction transverse to a mirror supporting surface, if present.

In a preferred embodiment of an actuator mechanism according to the third aspect of the disclosure, the mechanism may be configured such that the first gearwheel and the second gearwheel are both part of the same drive train. This need not be the case, however. For instance, in embodiments, also a gearwheel of a second drive train may be placed on the output shaft of an electric motor of a first drive train.

Further, it is noted that it may be advantageous that the actuator mechanism can be configured such that during use the second gearwheel rotates in the same rotational direction as the output shaft on which it is rotatingly bearing-mounted. For in such a case the difference in speed between this gearwheel and the shaft on which it is placed can be relatively small with respect to a gearwheel that would rotate around a stationary auxiliary shaft in the actuator mechanism. Therefore, wear can be relatively limited and/or the bearing can for instance be of relatively simple, inexpensive and/or small design, so that the actuator mechanism can be made of relatively durable, simple, compact and/or inexpensive design.

The inventive actuator mechanism and exterior mirror devices of this disclosure will be further elucidated on the basis of non-limiting exemplary embodiments, which are represented in a drawing. In the drawing.

It is noted that the drawing figures are merely schematic representations of preferred embodiments of the invention. In the drawing figures, like or corresponding parts are denoted with the same or corresponding reference numerals.

As regards the purport of this disclosure, it is pointed out that all the technical features and elements specifically described and/or shown here, are also understood to have been described and/or shown separately and can each also be applied individually and/or can be applied in combination with one or more other features and/or elements and are understood to have been described herein as such. The skilled person reading the description will understand that such technical features and/or elements can be considered separately from the context of the given exemplary embodiment, and furthermore can be considered separately from the technical features with which they cooperate in the context of the example. In order to keep the description concise, however, these features, elements and combinations are not all literally described and/or shown as a separate feature, element, combination or embodiment.

Figure 1:
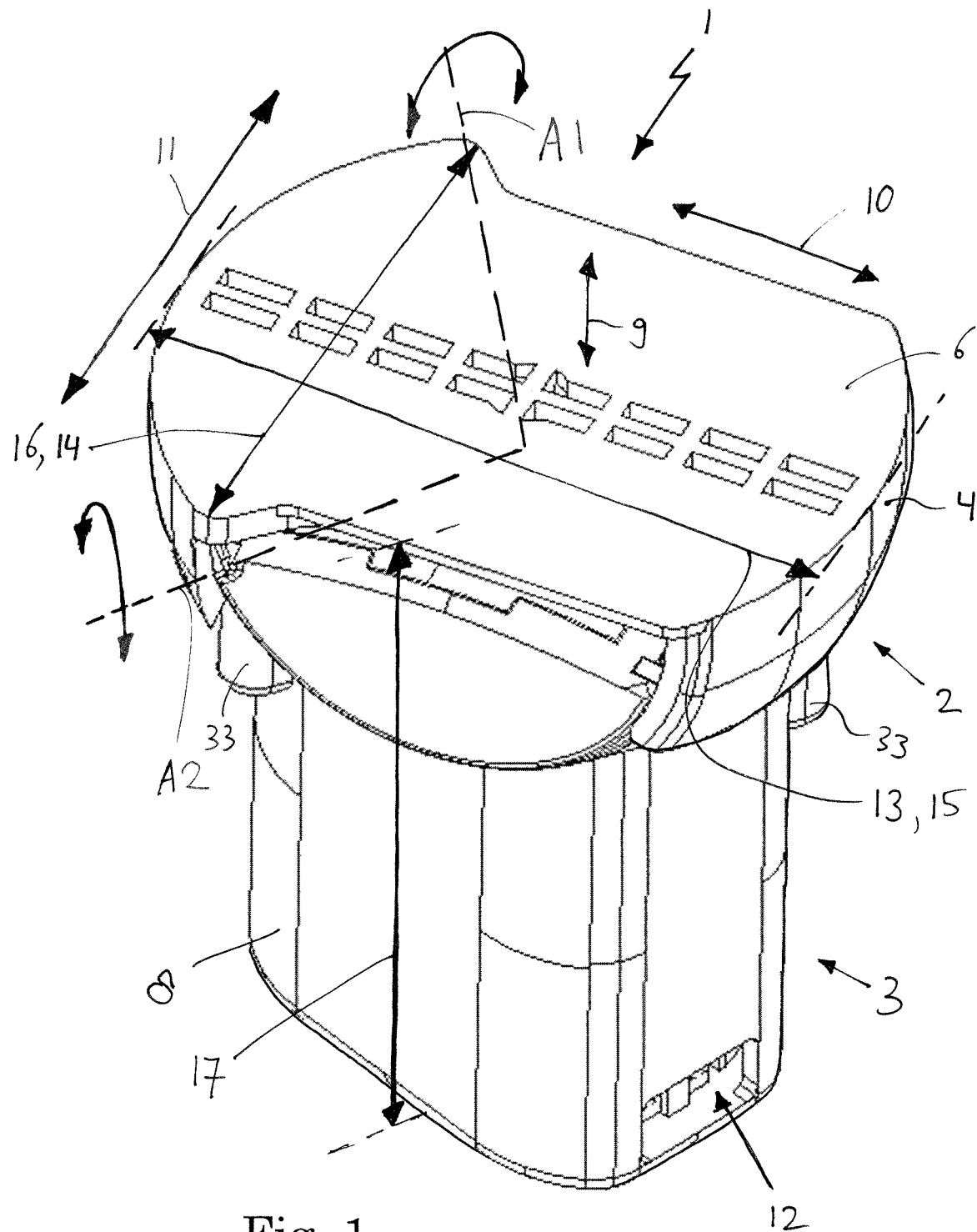
FIG. 1 shows a schematic perspective view of an actuator mechanism according to a first embodiment of a first aspect of the disclosure.

FIG. 1 shows a schematic perspective view of an actuator mechanism 1 according to a first embodiment of a first aspect of the disclosure. The actuator mechanism 1 is suitable for adjusting at least one angular position of a mirror element 2 in an exterior mirror device for a motor vehicle. The actuator mechanism 1 comprises a base element 3 and a mirror element 2 movably coupled with the base element 3. The mirror element 2 is rotatable relative to the base element 3 about at least a first pivoting axis A1. It is noted that, in embodiments, the movement of the mirror element 2 can have multiple degrees of movement relative to the base element 3.

In a preferred embodiment, the mirror element 2 may, for instance, also be rotatable about a second pivoting axis A2, which is substantially transverse to the first pivoting axis A1.

It is noted that the mirror element 2 comprises a mirror support 4 for supporting a mirror surface. The mirror support 4 has a supporting surface 6 on which it can support the mirror surface during use. The supporting surface 6 is here a substantially flat surface, but may alternatively also be a substantially curved surface, for instance, a singly curved surface, but also, for instance, a doubly curved surface. The curved surface can be, for instance, concave. In a preferred embodiment, the curved surface can be convex, for instance for supporting a convex mirror surface, which can be applied, for instance, for a blind spot mirror.

Preferably, an actuator mechanism 1 can be part of an exterior mirror device for a motor vehicle, such as, for instance, a blind spot mirror device. The exterior mirror device can then comprise a housing and a mirror element 2 rotatable relative to the housing about at least a first pivoting axis, which mirror element 2 comprises a mirror surface, supported by a mirror support 4, which mirror surface can for instance form a convex mirror surface, for instance to be able to serve as a blind spot mirror.

In embodiments of the actuator mechanism 1, the supporting surface 6 can for instance have a width 13 which is less than 10 cm or 8 cm, preferably less than 6 cm or 5 cm, for instance less than 4 cm or less than 3 cm. Additionally, the supporting surface 6 can have a length 14 which extends transversely to the width 13 of the supporting surface 6 and which is less than 10 cm or 8 cm, preferably less than 6 cm or 5 cm, for instance less than 4 cm or less than 3 cm.

The mirror surface mentioned may be formed, for instance, by a mirror glass, but may possibly be formed differently, as, for instance, with the aid of a mirroring coating which is supported directly by the mirror support 4 or which is arranged, for instance, on a, preferably plate-shaped, member, this member being carried by the mirror support 4. In embodiments of the actuator mechanism 1, the mirror element 2 can therefore comprise a mirror surface supported by the mirror support 4. The mirror surface can be substantially a flat mirror surface and be formed on or by a member, such as, for instance, the mirror glass, that has a substantially uniform thickness in a depth direction 9 which is substantially transverse to the width direction 10 and to the length direction 11 of the mirror support 4. However, all kinds of other forms are also possible. Thus, the member mentioned can comprise, for instance, a convex mirror surface at its front and have a flat rear side which can be placed on or against a flat supporting surface 6 of the mirror support 4.

Regarding the base element 3, it is noted that it can comprise, for instance, a casing 8, preferably for at least partly housing one or more electric motors 5, 7 for moving the mirror element 2 relative to the base element 3 and/or for at least partly housing one or more drive trains 50, 70 for moving the mirror element 2. However, it is noted that one or more electric motors 5, 7 in alternative embodiments may be housed at least partly in the mirror element 2.

The base element 3 may be housed in a housing of an exterior mirror device and may be substantially immovably fixed therein. For instance, the base element 3 may to that end be provided with fastening or fixation means 33 and/or with plug or socket means 12 for connection of cabling, for instance for an electric motor 5, 7 of the actuator mechanism 1. Alternatively, the base element 3 of the actuator mechanism 1 may form an integrated portion of the housing of the exterior mirror device.

Figure 2:
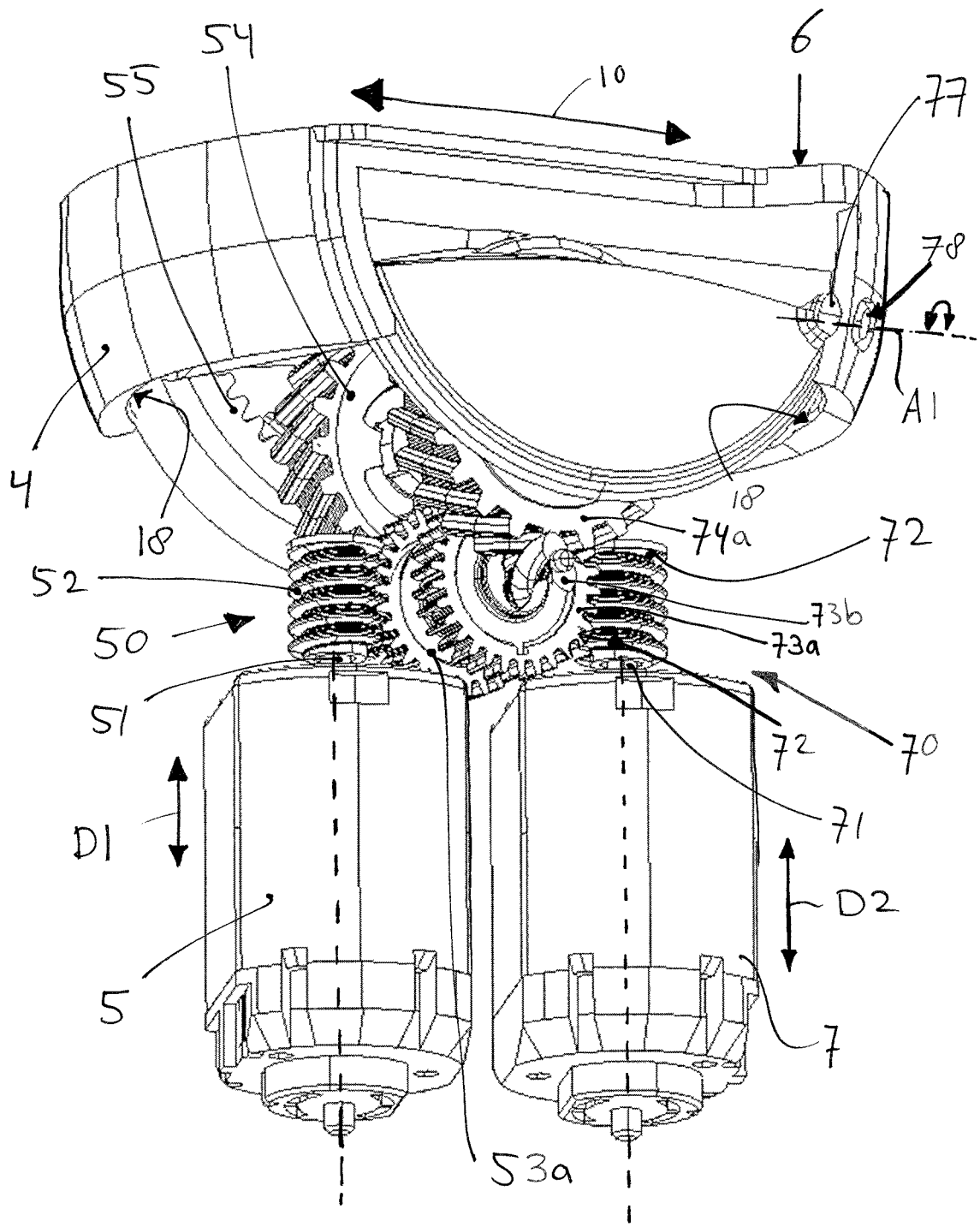
FIG. 2 shows a schematic perspective view of the actuator mechanism of FIG. 1, in which among other parts a casing of a base element of the actuator mechanism has been omitted.

FIG. 2 shows a schematic perspective view of a part of the actuator mechanism 1 of FIG. 1. In FIG. 2, among other parts, the casing 8 of the base element 3 is omitted. As a result, among other parts, a first electric motor 5 of the actuator mechanism 1 is visible.

With the aid of the first electric motor 5 provided in the actuator mechanism 1, the mirror element 2 is rotatable relative to the base element 3 about at least the first pivoting axis A1.

As noted, the mirror element 2 may furthermore be rotatable also about a second pivoting axis A2, which is substantially transverse to the first pivoting axis A1. This can be done, for instance, with the aid of a second electric motor 7 provided in the actuator mechanism 1.

It is noted that the first pivoting axis A1, and that preferably also the second pivoting axis A2, at least in the neutral position of the supporting surface, can extend substantially transversely to the depth direction 9 of the thickness of the member comprising the mirror surface, and/or can extend substantially parallel to a plane extending in the width direction 10 and in the length direction 11 of the mirror support 4. Additionally or alternatively, the first pivoting axis A1, and preferably also the second pivoting axis A2, may be so placed as to extend, during use, substantially parallel to a flat mirror surface and/or substantially parallel to a flat plane which directionally approximates a possibly curved, for instance convex, mirror surface as well as possible. It is noted that in this paragraph 'substantially' can at least be understood to mean that the pivoting axis/axes and/or the plane in which the pivoting axes extend, includes a smallest angle with the mirror surface or with a flat plane which directionally approximates a possibly curved mirror surface as well as possible, that may be between 0° and 35°, 25°, 20°, 15° or 10°.

In the actuator mechanism 1 the first electric motor 5 extends in a first longitudinal direction D1 which is substantially transverse to the supporting surface 6. A second electric motor 7, if present, can most preferably extend in a second longitudinal direction D2 which is also substantially transverse to the supporting surface 6 of the mirror support 4. In embodiments, the first and second motors 5, 7, which may be housed, for instance, at least partly, in the base element 3, or in the mirror element 2, may be placed substantially parallel to each other, preferably substantially next to each other.

In advantageous embodiments, the base element 3 of the actuator mechanism 1 can have a length 16 and/or a width 15, which, as for instance in the example of FIG. 1, corresponds for instance to the length 14 and the width 13, respectively, of the supporting surface 6, while such length 16 and/or a width 15 of the base element 3 is substantially not greater, and is preferably less, than the height 17 of the actuator mechanism 1 extending substantially transversely to the supporting surface 6 of the mirror support 4 and/or the height of the base element 3 extending substantially transversely to the supporting surface 6 of the mirror support 4. This means that, in embodiments, the 'footprint' of the supporting surface, the length of the supporting surface and/or the width of the supporting surface can therefore be kept relatively small at the expense of the height of the height of the actuator mechanism 1.

Further, the mirror element 2 can comprise at least one spherically shaped hinge and/or bearing part 18, for instance a concavely shaped or cup-shaped part 18, with the aid of which the mirror element 2 may be hingedly connected with the base element 3 and/or may be bearing-mounted relative thereto. The base element 3 can then comprise at least one spherically shaped hinge and/or bearing part, for instance a convexly shaped part, to cooperate with the at least one spherically shaped hinge and/or bearing part 18 of the mirror element 2. Alternatively, for instance, the mirror element can comprise a convex hinge and/or bearing surface which, together with a cup-shaped hinge and/or bearing surface of the base part, can form a kind of ball hinge and/or ball bearing.

Figure 3:
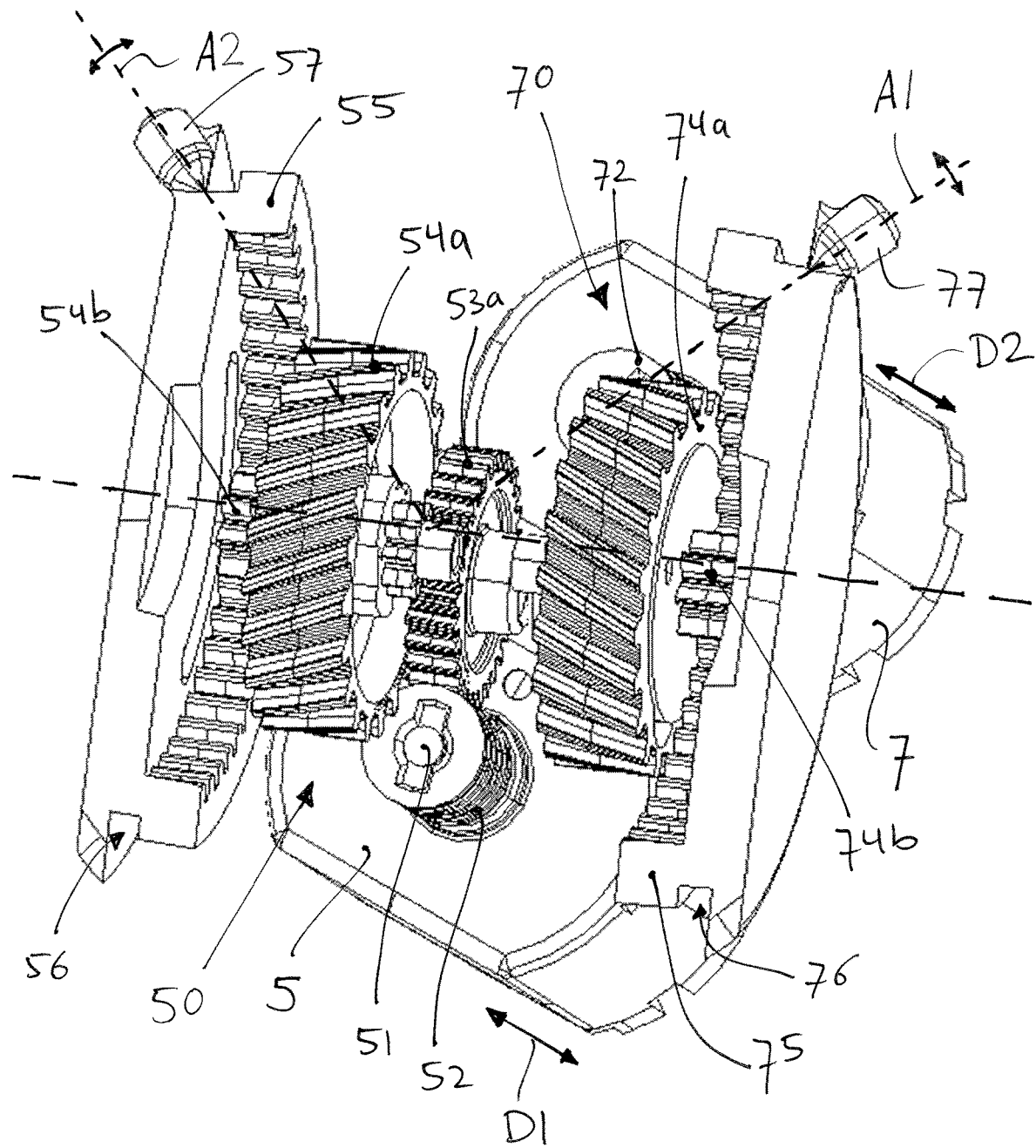
FIG. 3 shows a further schematic perspective view of the actuator mechanism of FIGS. 1 and 2, in which furthermore also a mirror support has been omitted.
Figure 4:
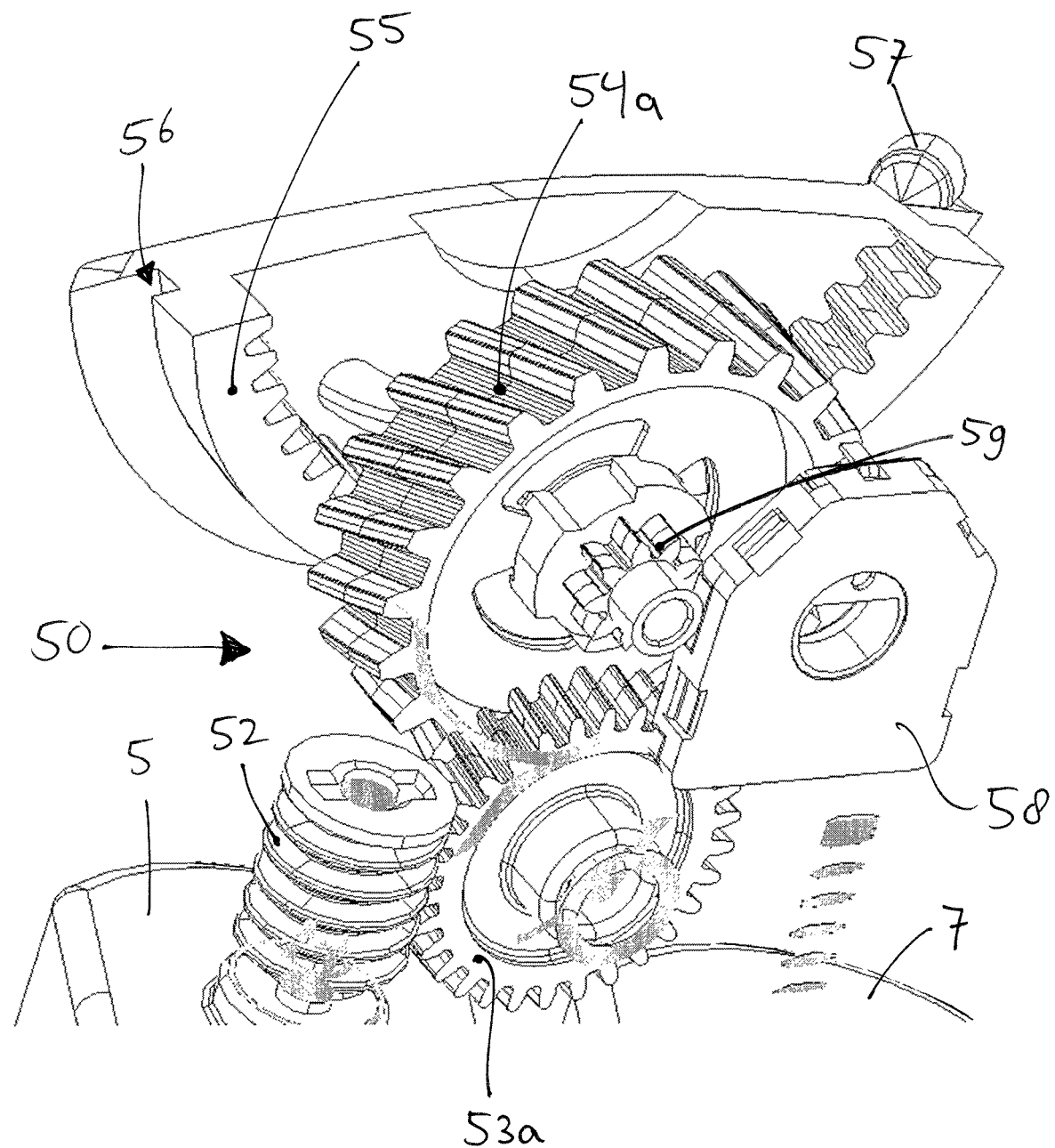
FIG. 4 shows a schematic perspective view of a cross section of the part shown in FIG. 3 of the actuator mechanism of FIGS. 1 and 2.

FIGS. 3 and 4 show further schematic perspective views of the actuator mechanism 1 of FIGS. 1 and 2, in which also the mirror support 4 has been omitted for the purpose of a relatively good visualization of the drive trains 50, 70 via which the electric motors 5, 7 can move the mirror support 4 relative to the base element 3.

In the following, with reference to the example of the drive trains 50, 70 of the exemplary embodiment of FIGS. 1-4, it will be described how a possible drive train, via which the respective electric motor 5, 7 can rotate the mirror support 4 to a certain extent about the respective pivoting axis A1, A2, can be made up, by way of example. It is noted that in the example shown the first and second drive train 50, 70 are of comparable design and are substantially mirrored relative to each other, but that this need not be the case in alternative embodiments.

As can be seen in FIG. 2, the output shaft 51, 71 of the motor 5, 7 is provided with a first gearwheel 52, 72, implemented as a worm wheel 52, 72, which engages a second gearwheel 53a, 73a having relatively many teeth, which is substantially non-rotatably coupled with a third gearwheel 53b, 73b having relatively few teeth, which can have, for instance, an evoloid toothing, for example as known from international patent publication WO 02/068 242. The toothing of the third gearwheel 53b, 73b engages a fourth gearwheel 54a, 74a which during use is substantially non-rotatably coupled with a fifth gearwheel 54b, 74b (see FIG. 3), for instance with the aid of a slip coupling. The fifth gearwheel 54b, 74b cooperates with an inner toothing of a non-straight, here a circular arc segment-forming, drive rod 55, 75.

The drive rod 55, 75, coupled to the respective electric motor 5, 7 here via the gearwheels mentioned but in other embodiments via other drive means, is bearing-mounted relative to the base element 3, for instance with the aid of a bearing slot 56, 76.

When the output shaft 50, 70 of the motor 5, 7 is driven, it will cause the drive rod 55, 75, preferably with a strong reduction, to move. The actuator mechanism 1 may for instance be so configured that the drive rod 55, 75 can locally push up the mirror element 4 and/or pull it down. This may for instance be taken care of with the aid of a driving part 57, 77, which may for instance be mounted rotatably about the respective pivoting axis A2, A1, for instance in a recess 58, 78 in the mirror element 4. The driving part 57, 77 can thus form, for instance, a pivoting point of the pivoting axis A2, A1 about which the other driving part 77, 57, when driven with the aid of respective drive train 70, 50, can rotate the mirror element 2.

By locally, adjacent the respective driving part 57, 77, pushing up and/or, by contrast, pulling down the mirror element 4 provided rotatably relative to the base element 3, the mirror element 4 can rotate about the pivoting axis A1, A2, which can hence preferably pass through the other driving part 77, 57.

Since in the embodiment of FIGS. 1-4 the two rotatable drive rods 55, 75 are not located in a plane that is transverse to the pivoting axis A1, A2 around which the respective drive rods 55, 75 can rotate the mirror element 4, but in this case, for instance, include an angle of about 45° therewith, it may be advantageous in this embodiment to mount the driving parts 57, 77 with some play between the respective drive rod 55, 75 and the mirror element 4.

As can be seen in FIG. 4, in embodiments, a sensor, for instance a potentiometer 58, 78 may be provided, which, for instance with the aid of one or more gearwheels 59, 79 may be coupled to one 54, 74 of the elements of the drive train 50, 70 in order to enable monitoring of the displacement of mirror element 4 about the respective pivoting axis A1, A2. For this purpose, also a different sensor, such as, for instance, a Hall sensor or a pressure sensor could be used.

Figure 5:
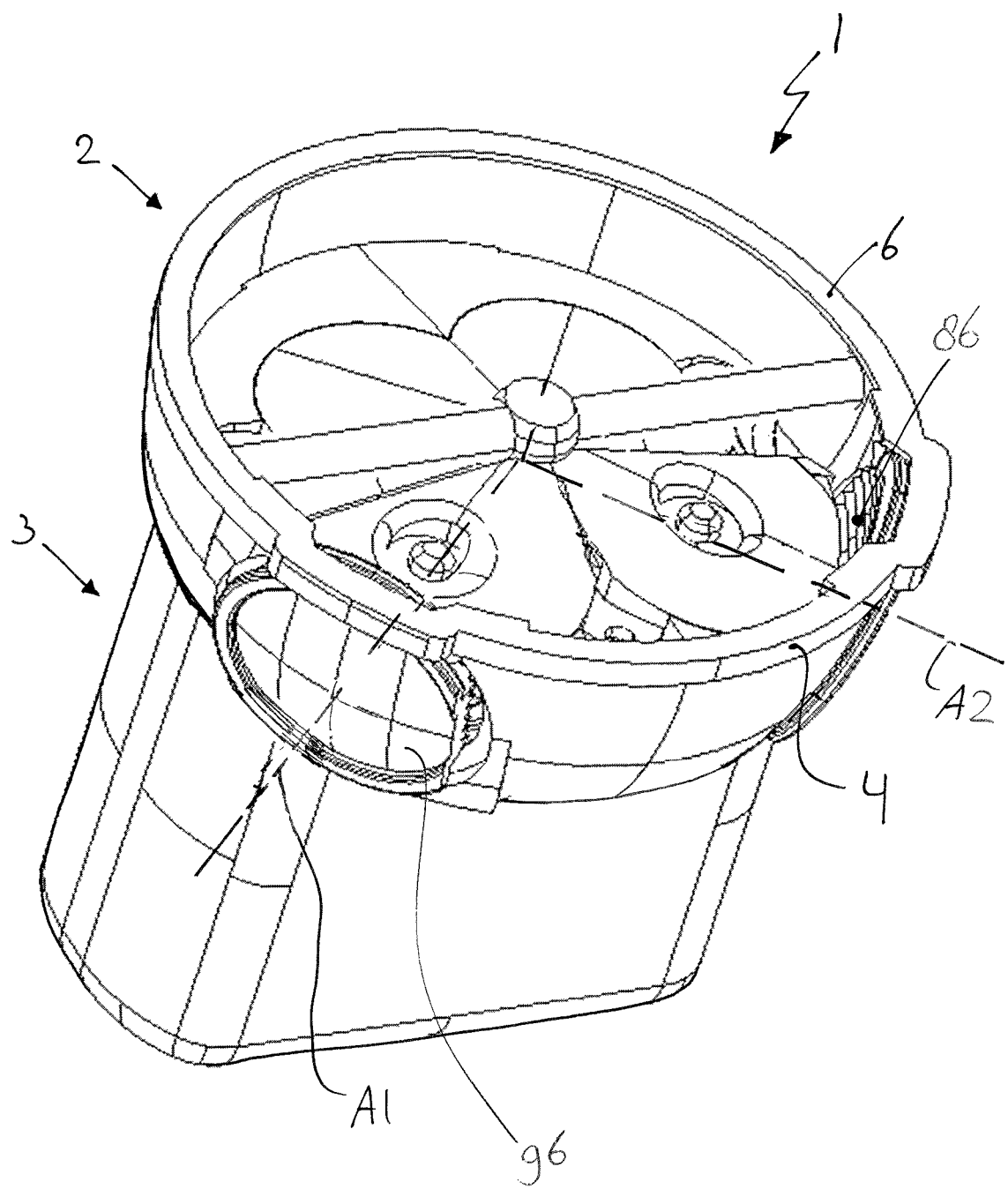
FIG. 5 shows a schematic perspective view of an embodiment of an alternative actuator mechanism.

FIG. 5 shows a schematic perspective view of an embodiment of an alternative actuator mechanism 1. Here, the supporting surface 6 of the mirror element 4 is of substantially ring-shaped design. Here also, the mirror element 4 is rotatable about pivoting axes relative to the base element 3 in which the electric motors 5, 7 extend substantially transversely to the supporting surface 6 to be rotated to some extent.

Figure 6:
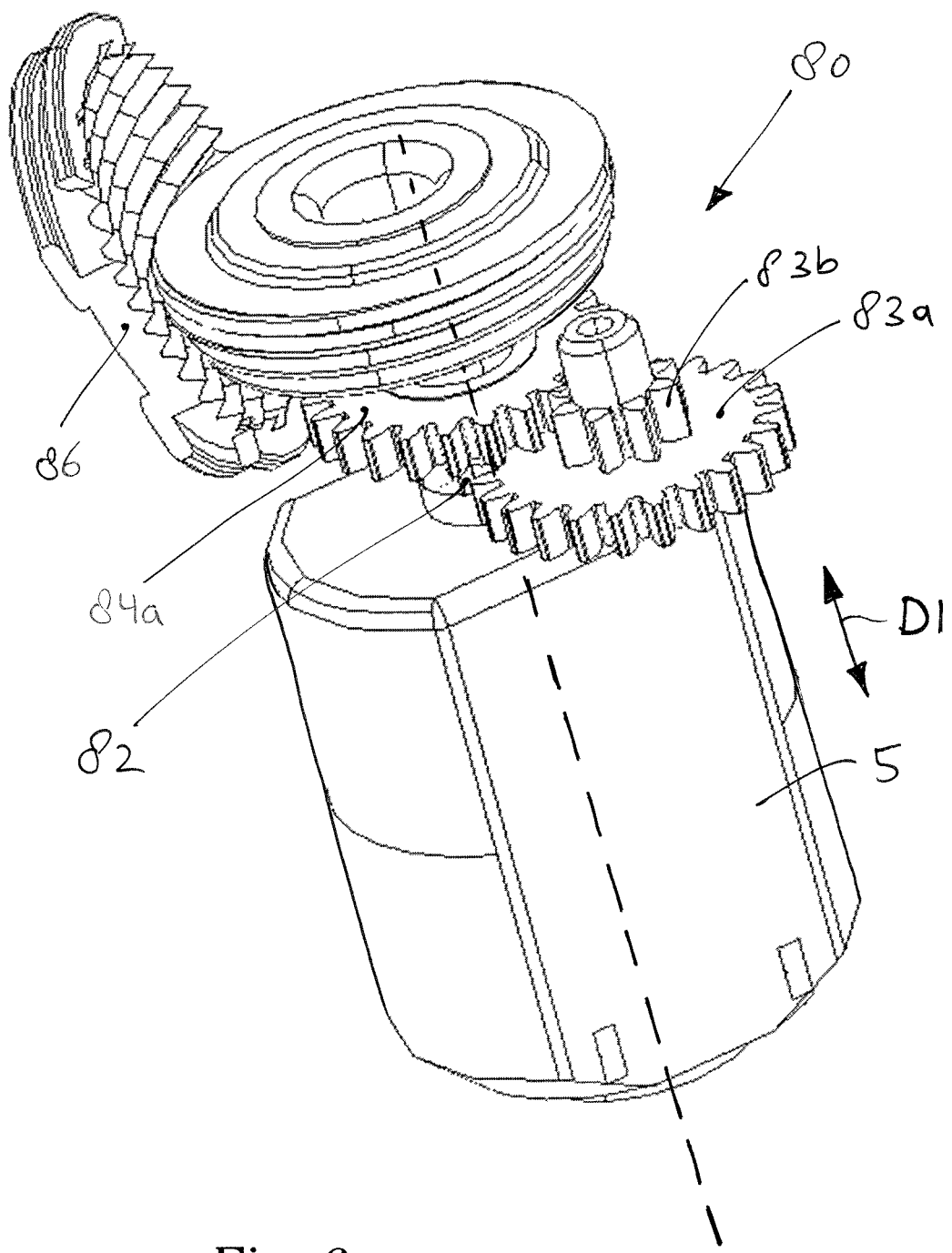
FIG. 6 shows a schematic perspective view of a drive train that forms a detail of the actuator mechanism of FIG. 5.
Figure 7:
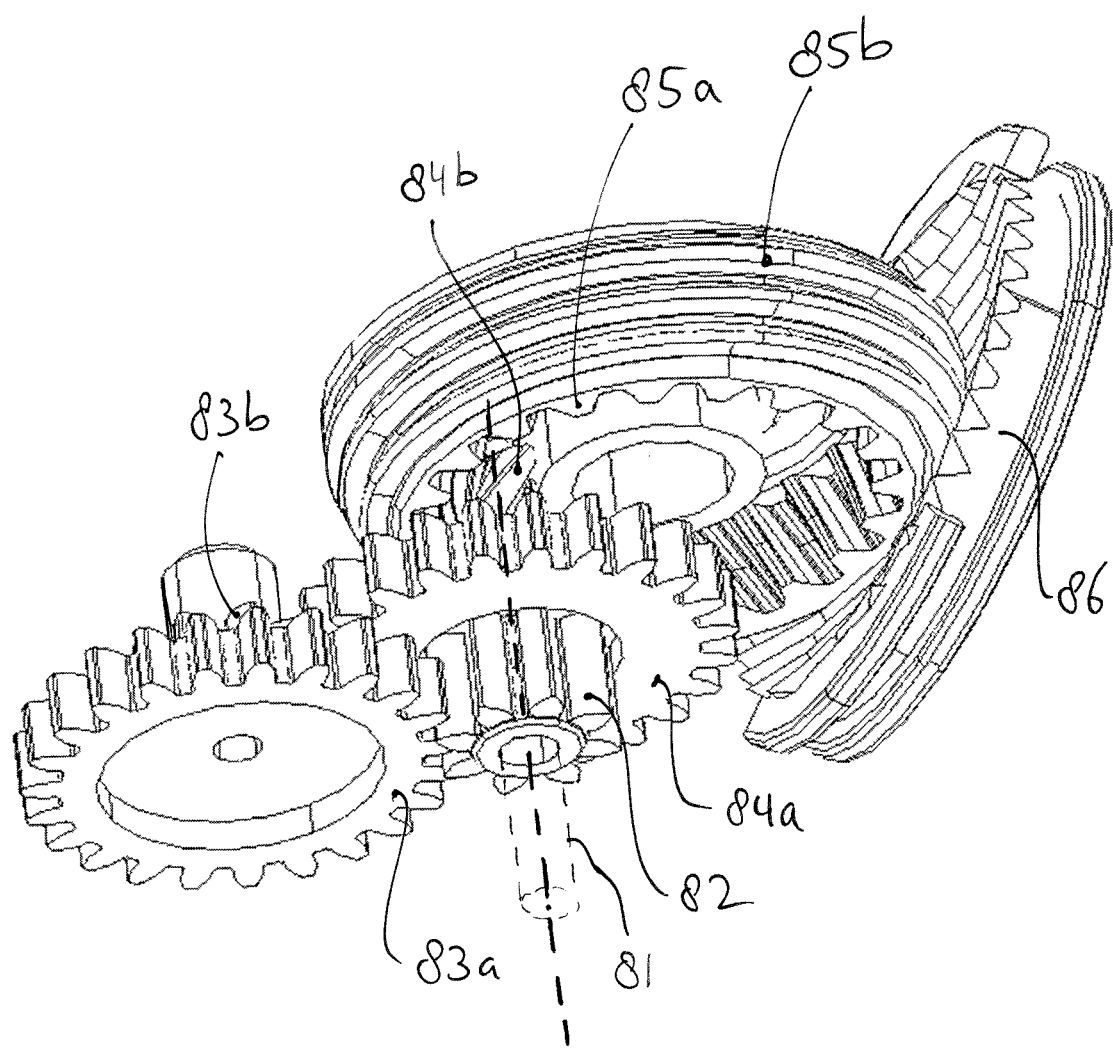
FIG. 7 shows a schematic perspective view of a detail of the drive train of FIG. 6.

FIG. 6 shows a schematic perspective view of a drive train 80 which forms a detail of the actuator mechanism 1 of FIG. 5. FIG. 7 shows a schematic perspective view of a detail thereof. Here also, the actuator mechanism 1 comprises a first electric motor 5 with an output shaft 81 which by means of a first drive train 80 drives a first drive rod 86 to thereby cause the mirror element 2, at a position laterally remote from the first pivoting axis A1, to locally move up and/or down relative to the base element 3 in order to rotate the mirror element 2 about the first pivoting axis A1 relative to the base element 3.

As can be seen in FIGS. 5-7, in this exemplary embodiment, on a driven shaft 81 of the motor 5 a first gearwheel 82 is mounted substantially non-rotatably. The first gearwheel 82 drives a second gearwheel 83a which is substantially non-rotatably coupled with a third gearwheel 83b which drives a fourth gearwheel 84a. Substantially non-rotatably connected with said gearwheel 84a, a fifth gearwheel 84b having for instance an evoloid toothing is provided which engages an inner toothing 85a of an outer toothing 85b substantially non-rotatably provided therewith, here in the form of a worm 85b, which engages a drive rod 86, which is here implemented as a worm wheel segment with inner toothing. By rotating the drive rod 86 with the aid of the first electric motor 5 and the first drive train 80 up or down about pivoting axis A1, the mirror element 2, provided hingeably relative to the base element 3 about the two mutually transverse pivoting axes or hinge axes A1, A2, is rotated about the first pivoting axis A1.

A second electric motor 6 (not shown here) can, with the aid of a second drive train 90 (not shown here), drive a second drive rod 96 to enable rotation of the mirror element 2 about a second pivoting axis A2 as well.

For instance as in the example shown here, the first drive rod 86 can also form a hinge for the pivoting axis A2 about which the mirror element can be rotated when the second drive rod 96 is driven. In order to be able to serve as hinges, the drive rods 86, 96 may be rotatably suspended in the mirror element 2.

As has been visualized with reference to FIG. 7, a first gearwheel 82, such as, for instance, an involute gearwheel or a worm wheel, may be substantially at least substantially non-rotatably mounted on an output shaft 81 of a first electric motor 5 of an actuator mechanism 1, while at least one other gearwheel 84a, 84b, such as for instance an involute gearwheel, a hypoid gearwheel or a worm wheel, which is preferably part of the same drive train 80 as the first gearwheel 82, is provided rotationally, and preferably bearing-mounted, on said output shaft of the first electric motor and is preferably substantially fixed in axial direction. As a result, an actuator mechanism 1 can be made, for instance, of relatively compact and/or robust design. Since bearing axes, which are usually made of steel, are relatively costly, cost price reductions can be realized by mounting another gearwheel on a motor shaft already on hand.

Just like the first gearwheel 82, the other gearwheel 84a, 84b can, during use, preferably rotate in the same rotational direction as the output shaft 81 of the first electric motor 5, more preferably with a lesser speed of revolution than the output shaft 81.

The invention is not limited to the exemplary embodiments given here. Many implementation variants are possible.

Such variants will be clear to one skilled in the art, and are understood to be within the scope of the invention as set forth in the following claims.

The invention claimed is:

1. An actuator mechanism for adjusting at least one angular position of a mirror element in an exterior mirror device for a motor vehicle, comprising:
 a base element;
 a mirror element movably coupled with the base element, the mirror element further comprising a mirror support including a single supporting surface configured to support a mirror surface;
 a first electric motor; and
 a second electric motor, wherein
 the mirror element is rotatable relative to the base element about at least a first pivoting axis with the aid of the first electric motor and about a second pivoting axis with the aid of the second electric motor,
 the first pivoting axis is substantially parallel to a plane of the single supporting surface, wherein the plane intersects at least two opposing edges of the single supporting surface,
 the first electric motor extends in a longitudinal direction substantially transverse to the plane of the single supporting surface,
 the second pivoting axis is substantially transverse to the first pivoting axis and is substantially parallel to the plane of the single supporting surface, and
 the second electric motor extends in a longitudinal direction substantially transverse to the plane of the single supporting surface.

2. The actuator mechanism according to claim 1, wherein the first electric motor is housed at least partly in the base element.

3. The actuator mechanism according to claim 1, wherein the first electric motor is housed at least partly in the mirror element.

4. The actuator mechanism according to claim 1, wherein the single supporting surface has a width that is less than 4 cm or less than 3 cm.

5. The actuator mechanism according to claim 4, wherein the single supporting surface has a length which extends transverse to the width and the length is less than 4 cm or less than 3 cm.

6. The actuator mechanism according to claim 1, wherein the single supporting surface of the mirror support extends substantially in a flat plane.

7. The actuator mechanism according to claim 1, wherein the single supporting surface of the mirror support is formed as a convex surface.

8. The actuator mechanism according to claim 1, wherein the base element further comprises a length, a width, and a height extending substantially transverse to the plane of the single supporting surface, and the actuator mechanism comprises a height extending substantially transverse to the plane of the single supporting surface, wherein at least one of the length or the width of the base element is less than or equal to at least one of the height of the actuator mechanism or the height of the base element.

9. The actuator mechanism according to claim 1 wherein:

the mirror element further comprises at least one spherically shaped hinge part, having a concave shape or a cup shape, the base element comprises at least one spherically shaped hinge part having a convex shaped part to cooperate with the at least one spherically shaped hinge part of the mirror element, and the mirror element is rotatably connected with the base element.

10. The actuator mechanism according to claim 1, further comprising:

a first drive train coupled to a first output shaft of the first electric motor; and a first drive rod coupled to the first electric motor via the first drive train, wherein the first drive train drives the first drive rod to rotate the mirror element about the first pivoting axis.

11. The actuator mechanism according to claim 10, wherein:

a first gearwheel is non-rotatably mounted on the first output shaft of the first electric motor by means of a slip coupling, and a second gearwheel is rotatably bearing-mounted on the first output shaft of the first electric motor, and is substantially fixed in axial direction.

12. The actuator mechanism according to claim 11, wherein the first gearwheel and the second gearwheel are both part of the same drive train and during use of the actuator mechanism the second gearwheel rotates in a same rotational direction as the first output shaft of the first electric motor, but with a smaller speed of revolution than the speed of revolution of the first output shaft of the first electric motor.

13. An exterior mirror device for a motor vehicle, comprising a housing and the actuator mechanism of claim 1.

14. The exterior mirror device according to claim 13, wherein the mirror surface is convex and is configured to serve as a blind spot mirror.

15. The exterior mirror device according to claim 13, wherein the base element is housed in the housing of the exterior mirror device and is immovably fixed therein.

16. A motor vehicle, provided with the exterior mirror device of claim 13.

17. The exterior mirror device according to claim 13, wherein the base element forms an integrated portion of the housing of the exterior mirror device.

18. A motor vehicle, provided with the actuator mechanism of claim 1.

19. The actuator mechanism according to claim 1, further comprising:

a second drive train coupled to a first output shaft of the second electric motor; and a second drive rod coupled to the second electric motor via the second drive train, wherein the second drive train drives the second drive rod to rotate the mirror element about the second pivoting axis.

20. The actuator mechanism according to claim 1, wherein the first electric motor and the second electric motor are housed at least partly in the base element.

21. The actuator mechanism according to claim 1, wherein the first electric motor and the second electric motor are housed at least partly in the mirror element.

22. An actuator mechanism for adjusting at least one angular position of a mirror element in an exterior mirror device for a motor vehicle, comprising:

a base element;

a mirror element movably coupled with the base element, the mirror element further comprising a mirror support including a single supporting surface configured to support a mirror surface;

a first electric motor; and a second electric motor, wherein the mirror element is rotatable relative to the base element about at least a first pivoting axis with the aid of the first electric motor and about a second pivoting axis with the aid of the second electric motor, the first pivoting axis is substantially parallel to a plane of the single supporting surface, wherein the plane intersects at least two opposing edges of the single supporting surface, the first electric motor extends in a longitudinal direction substantially transverse to the plane of the single supporting surface, and the first electric motor and the second electric motor are placed substantially parallel to each other.

\* \* \* \* \*